(12) United States Patent
Chou et al.

(10) Patent No.: US 7,518,200 B2
(45) Date of Patent: Apr. 14, 2009

(54) SEMICONDUCTOR INTEGRATED CIRCUIT CHIP WITH A NANO-STRUCTURE-SURFACE PASSIVATION FILM

(75) Inventors: Bruce C. S. Chou, Hsin Chu (TW); Chen-Chih Fan, Chu Pei (TW)

(73) Assignee: EGIS Technology Inc., Taipei (TW)

( * ) Notice: Subject to any disclaimer, the term of this patent is extended or adjusted under 35 U.S.C. 154(b) by 99 days.

(21) Appl. No.: 11/723,907

(22) Filed: Mar. 22, 2007

(65) Prior Publication Data

US 2007/0222010 A1    Sep. 27, 2007

(30) Foreign Application Priority Data

Mar. 24, 2006    (TW) ............... 95110191 A

(51) Int. Cl.
| H01L 29/84 | (2006.01) |
| H01L 23/06 | (2006.01) |
| H01L 23/053 | (2006.01) |
| H01L 23/12 | (2006.01) |
| H01L 23/14 | (2006.01) |
| H01L 23/58 | (2006.01) |

(52) U.S. Cl. ............... 257/415; 257/684; 257/701; 257/702; 257/707; 257/798; 977/701; 977/720; 977/721

(58) Field of Classification Search ............... 257/684, 257/701–702, 707, 798, 415; 977/701, 720–721
See application file for complete search history.

(56) References Cited

U.S. PATENT DOCUMENTS

| 6,091,082 A | 7/2000 | Thomas et al. |
| 6,114,862 A | 9/2000 | Tartagni et al. |
| 6,515,488 B1 | 2/2003 | Thomas |
| 6,624,515 B1 * | 9/2003 | Parks ............... 257/758 |
| 6,759,264 B2 | 7/2004 | Chou et al. |
| 6,762,470 B2 | 7/2004 | Siegel et al. |
| 6,900,644 B2 | 5/2005 | Chou et al. |
| 6,906,339 B2 * | 6/2005 | Dutta ............... 257/40 |
| 6,958,265 B2 * | 10/2005 | Steimle et al. ............... 438/211 |
| 7,071,708 B2 | 7/2006 | Chou et al. |
| 7,099,497 B2 | 8/2006 | Chou et al. |
| 7,301,172 B2 * | 11/2007 | Atwater et al. ............... 257/79 |
| 7,316,167 B2 * | 1/2008 | DeConde et al. ............... 73/862.042 |
| 7,416,789 B2 * | 8/2008 | Breit et al. ............... 428/614 |
| 2004/0046574 A1 | 3/2004 | Chou |
| 2004/0208345 A1 | 10/2004 | Chou et al. |
| 2005/0010051 A1 | 1/2005 | Chou et al. |

(Continued)

FOREIGN PATENT DOCUMENTS

EP    1 256 899 A1    11/2002

(Continued)

*Primary Examiner*—Ida M Soward
(74) *Attorney, Agent, or Firm*—Muncy, Geissler, Olds & Lowe, PLLC

(57) ABSTRACT

A semiconductor integrated circuit (IC) chip includes an IC chip body and a nano-structure-surface passivation film. The IC chip body has at least one surface. The nano-structure-surface passivation film is formed on the at least one surface. The nano-structure-surface passivation film including nano-particles and a carrier resin protects the IC chip body from encountering any external interference. The IC chip body further has a plurality of fingerprint sensing members for sensing a whole fingerprint or a partial fingerprint.

9 Claims, 3 Drawing Sheets

U.S. PATENT DOCUMENTS

2006/0210128 A1    9/2006  Chou et al.
2007/0177880 A1*   8/2007  Karasikov et al. ............ 398/170
2008/0093608 A1*   4/2008  Chik et al. .................... 257/89
2008/0093728 A1*   4/2008  Mahler et al. ................ 257/701

FOREIGN PATENT DOCUMENTS

WO    WO-01/06448 A1    1/2001
WO    WO-03/098541 A1   11/2003

* cited by examiner

SEMICONDUCTOR INTEGRATED CIRCUIT CHIP WITH A NANO-STRUCTURE-SURFACE PASSIVATION FILM

CROSS REFERENCE TO RELATED APPLICATIONS

The invention correlates to the following commonly assigned patent applications: (a). U.S. patent application Ser. No. 10/403,052, filed on Apr. 1, 2003, entitled "CAPACITIVE FINGERPRINT SENSOR", and issued on Aug. 29, 2006 as U.S. Pat. No. 7,099,497; (b). U.S. patent application Ser. No. 10/434,833, filed on May 13, 2003, entitled "PRESSURE TYPE FINGERPRINT SENSOR FABRICATION METHOD", and issued on Jul. 06, 2004 as U.S. Pat. No. 6,759,264; (c). U.S. patent application Ser. No. 10/414,214 (US20040208345A1), filed on Apr. 16, 2003, and entitled "THERMOELECTRIC SENSOR FOR FINGERPRINT THERMAL IMAGING"; (d). U.S. patent application Ser. No. 10/638,371 (US20040046574A1), filed on Aug. 12, 2003, and entitled "CAPACITIVE MICRO PRESSURE SENSING MEMBER AND FINGERPRINT SENSOR USING THE SAME"; (e). U.S. patent application Ser. No. 10/429,733, filed on May 6, 2003, entitled "CAPACITIVE FINGERPRINT SENSOR AGAINST ESD DAMAGE AND CONTAMINATION INTERFERENCE AND A METHOD FOR MANUFACTURING THE SAME", and issued on May 31, 2005 as U.S. Pat. No. 6,900,644; (f). U.S. patent application Ser. No. 10/825,313, filed on Apr. 16, 2004, entitled "CHIP-TYPE SENSOR AGAINST ESD AND STRESS DAMAGES AND CONTAMINATION INTERFERENCE", and issued on Jul. 04, 2006 as U.S. Pat. No. 7,071,708; and (g) U.S. patent application Ser. No. 11/376,179 (US20060210128A1), filed on Mar. 16, 2006, and entitled "LINEAR IMAGE SENSING DEVICE WITH IMAGE MATCHING FUNCTION AND PROCESSING METHOD THEREFOR".

BACKGROUND OF THE INVENTION

1. Field of Invention

The invention relates to a semiconductor integrated circuit chip with a nano-structure-surface passivation film and a method of fabricating the same, and more particularly to a method of fabricating a semiconductor integrated circuit chip, which has a nano-structure-surface passivation film and is free from encountering any external interference, and the semiconductor integrated circuit chip formed using this method. The invention is extended from the commonly assigned U.S. patent application Ser. No. 10/989,510 (US20050110051A1), filed on Nov. 17, 2004, and entitled "SURFACE PROCESSING METHOD FOR A CHIP DEVICE AND A CHIP DEVICE FORMED BY THE METHOD".

2. Related Art

The method of manufacturing a chip in the field of the semiconductor manufacturing processes usually has to consider the electrical property provided by the chip, and to package the chip in a package body by packaging procedures so as to get rid of any possible damage caused by external forces such as the pressure and the electrostatic discharge.

However, with the development of the chip application field, the new application needs to expose a portion of a chip surface to the environment. For example, a chip-type fingerprint sensor must have a chip surface for contacting a finger to read the fingerprint of the finger for the identification. Thus, the mechanical property of the chip surface has to be considered to provide a surface with wear-resistant, pressure-resistant, hydrophobic, oleophobic and contamination-resistant properties.

Conventionally, a basic structure of a capacitive fingerprint sensing chip includes a silicon substrate in which associated sensing and control processing circuits are formed. A plurality of metal plates serving as sense electrodes are arranged in an array on the surface of the chip. Herein, the sense electrodes, the sensing and control processing circuits, and the silicon substrate are referred to as a substrate structure. In addition, a dielectric material layer serving as a dielectric material of a sense capacitor and an exposed protection layer for the chip is formed on an outermost surface of the chip. In order to achieve the pressure-resistant and the wear-resistant properties of the chip surface, the prior art adopts a hard dielectric material to serve as the outermost protection layer, as disclosed in WO 01/06448A1, WO 03/098541A1, U.S. Pat. No. 6,091,082, EP1256899, U.S. Pat. No. 6,114,862 and U.S. Pat. No. 6,515,488. In brief, the prior art inventions usually have a hard material layer, such as a silicon dioxide layer, a silicon nitride layer or a silicon carbide layer, formed above the substrate structure.

The silicon dioxide and the silicon nitride are the hydrophilic and oleophilic materials that form hydrophilic and oleophilic surfaces, on which the finger oil or finger sweat is easily remained as a latent fingerprint when the sensor is used. The silicon carbide material has a better hydrophobic property but still is an oleophilic material. So, the latent fingerprint problem from the finger lotion or oil contamination still exists. Furthermore, when the above-mentioned materials are deposited, the surface roughness cannot be easily controlled to reduce the surface wetting effect. Therefore, a CMP (Chemical Mechanical Polishing) process has to be performed to get a smooth surface and reduce the wetting effect of the sensor surface, on which the latent finger problem is minimized. This, however, may increase the manufacturing complexity and cost. A method for filling the silicon dioxide into a plurality of small voids and thus obtaining a smooth external surface by depositing the silicon dioxide and then performing the CMP process has been disclosed in U.S. Pat. No. 6,515,488 to Thomas. However, the manufacturing processes are too complicated and are not suitable for the typical manufacturing processes of the commercial wafer foundry.

In U.S. Pat. No. 6,762,470 patent, Siegel et. al. disclose a design having a Teflon material formed on the chip surface in order to solve the problem of the hydrophobic, oleophobic and contamination-resistant surface properties. However, Teflon (the Trademark of DUPONT) is a fluorocarbon (FC) polymer, which cannot be effectively bonded to the material, such as the silicon dioxide and the silicon nitride formed on the surface of the semiconductor chip, having the higher surface energy. So, after multiple times of fingerprint test rubbing, this kind of material tends to detach from the fingerprint sensor.

In order to solve this problem, the present inventors disclose a best material choice of bonding a silane group to the other end of the fluorocarbon (FC) polymer in the US20050110051A1 patent. This is because the Si—O—CH$_3$ or Si—O—C$_2$H$_5$ in the silane group tends to be hydrolyzed into Si—O— or Si—OH group. This group and the silicon dioxide or silicon nitride on the surface of the semiconductor chip can form covalent bond or hydrogen bond of "—Si—O—Si—" or "Si—O—H" with the high bonding intensity.

In order to facilitate the manufacture and the production, the above-mentioned method prepares the polymeric monomers in the form of solution, which is applied to the surface of the semiconductor chip surface by way of immersion, spin coating or spray coating. Then, a high temperature (greater than 60 degrees centigrade) and high humidity (90%) environment is provided to facilitate the polymerization and curing.

However, one main drawback of this method is that the manufacturing and curing processes of the polymeric monomers only can form the thickness of the molecular layer on the chip surface. That is, the maximum thickness thereof is only several tens of nanometers, and the layer will be scraped due to the improper use of the chip, thereby deteriorating the effect of resisting the contamination.

Furthermore, because the uneven surface of the chip may be formed when the chip is being manufactured, it is impossible to form an even surface even if the method of the US20050110051A1 patent is adopted. Similarly, contamination tends to be accumulated in the voids of the chip surface.

Most important of all, electronic products containing the halogen compound will be prohibited in order to meet the environment protection requirement in the future. Thus, the method using the fluoride to improve the hydrophobic, oleophobic and contamination-resistant surface properties of the chip surface may induce a great environment protection problem.

The invention provides another solution in order to extend the spirit of the US20050110051A1 patent mentioned hereinabove, to avoid the contamination of the chip surface, and to solve the problems encountered in the US20050110051A1 patent.

SUMMARY OF THE INVENTION

It is therefore an object of the invention to provide a method of treating a surface of a semiconductor integrated circuit chip, and the semiconductor integrated circuit chip formed using this method in order to prevent external factors such as contamination, water and oil from interfering the operation of the semiconductor integrated circuit chip such as the operation of a capacitive fingerprint sensor.

To achieve the above-identified object, the invention provides a semiconductor integrated circuit chip including an integrated circuit (IC) chip body having at least one surface, and a nano-structure-surface passivation film, which is formed on the at least one surface and contains nano-particles and a carrier resin, for protecting the IC chip body from encountering any external interference.

In addition, the invention also provides a method of fabricating a semiconductor integrated circuit chip, comprising the steps of: providing an integrated circuit (IC) chip body having at least one exposed surface; applying a composite resin containing nano-particles and a carrier resin to the at least one surface of the IC chip body; and baking the composite resin to cure the composite resin and to form a nano-structure-surface passivation film, which has a lotus effect, for protecting the IC chip body from encountering any external interference.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

A conventional resin does not have the hydrophobic and oleophobic properties because the molecular structure thereof is basically a hydrocarbon structure. To solve this problem, metal nano-particles, ceramics nano-particles or polymeric nano-particles are doped in a carrier resin in this invention so that the composite carrier resin is baked at the high temperature (e.g., 150 degrees centigrade) and cured to form a nano-structure rough surface. Also, the same rough surface having the property equivalent to that of the surface of the lotus or the lotus leaf may be formed according to the high-temperature curing and phase changing principles. This property may be referred to as a lotus effect, which reduces the surface energy and thus enhances the hydrophobic and oleophobic properties. The nano-resin having the properties of the carrier resin and the nano-structure-surface may be formed. The reason of selecting the resin resides in the wear-resistant property and the high-hardness layer as compared with other polymeric materials such as polyimide. The resin is relatively suitable for the application to the surface of an object to be rubbed, wherein the object may be a sweep-type fingerprint sensing chip having a protective surface according to the invention.

Figure 1:
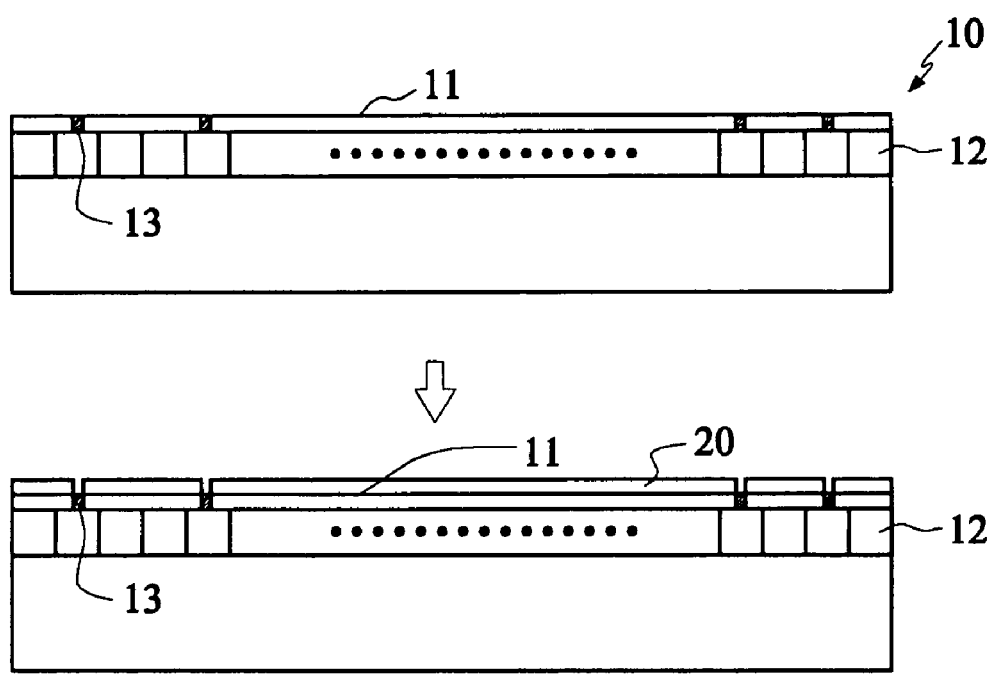
FIG. 1 is a schematic illustration showing a method of processing a surface of a semiconductor integrated circuit chip according to a preferred embodiment of the invention.
Figure 2:
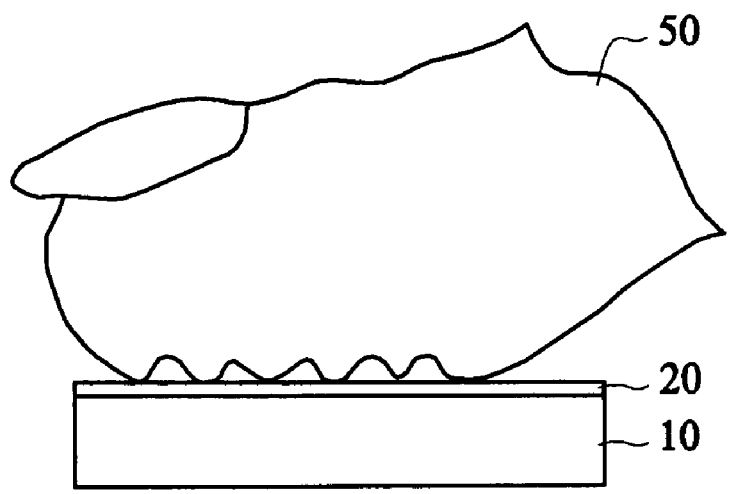
FIG. 2 shows an example of an application of the semiconductor IC chip of FIG. 1.

The method of fabricating the semiconductor integrated circuit chip having the nano-structure-surface passivation film will be described with reference to the accompanying drawings. Referring to FIGS. 1 and 2, the method of fabricating the passivation film of the semiconductor integrated circuit chip includes the following steps.

First, an IC chip body 10 having at least one exposed surface 11 is provided. When the invention is applied to a chip-type fingerprint sensor, as shown in FIG. 1, the IC chip body 10 further has multiple fingerprint sensing members 12 for sensing a whole fingerprint or a partial fingerprint of a finger. The number of the exposed surface 11 of the IC chip body 10 is one. The surface 11 of the IC chip body 10 is made of a dielectric material, such as silicon dioxide or silicon nitride, or is composed of a partially exposed dielectric material and a partially exposed metal material, such as aluminum and gold. In this embodiment, the exposed metal material forms an electrostatic discharge metal net structure 13 for discharging the electrostatic charges of the approaching finger, and the electrostatic discharge metal net structure 13 may be covered by the nano-structure-surface passivation film 20 or exposed from the nano-structure-surface passivation film 20.

Then, a composite resin containing nano-particles and a carrier resin is applied to the at least one surface 11 of the IC chip body 10 by way of immersion, spin coating or spray coating.

Next, the composite resin is baked and then cured under the suitable environment setting. Thus, the nano-structure-surface passivation film, which has the lotus effect, for protecting the IC chip body from encountering the external interference is formed. Because the thickness may be determined according to the fabricating parameters, such as the rotating speed of the spin coating, the optimum thickness ranges from 0.3 to 10 microns.

Thus, the semiconductor integrated circuit chip fabricated according to the above-mentioned method includes the IC chip body 10 and the nano-structure-surface passivation film 20. The IC chip body 10 has the at least one surface 11. The nano-structure-surface passivation film 20 is formed by applying a composite resin containing nano-particles and a carrier resin to the at least one surface 11 and then curing the composite resin. So, the nano-structure-surface passivation film 20, which is formed on the at least one surface 11 and contains, without limitation to, nano-particles and a carrier resin, can protect the IC chip body 10 from encountering any external interference mentioned hereinabove. For example, any dielectric or insulation material like aluminum oxide or titanium oxide capable of forming the nano-structure-surface may be applied to the invention. Vacuum deposition can be another manufacturing method for this dielectric or insulation material.

Because the thickness of the nano-structure-surface passivation film may be controlled, the uneven surface of the original chip may be planarized according to this principle so that the prior art drawbacks may be improved.

Figure 3:
FIG. 3 is a schematic illustration showing a fingerprint image obtained using the semiconductor IC chip of FIG. 2.

FIG. 2 shows an example of an application of the semiconductor IC chip of FIG. 1. As shown in FIG. 2, the IC chip body 10 may sense a fingerprint image (see FIG. 3) of a finger 50 when the finger 50 is placed on the IC chip body 10 stationarily.

Figure 4:
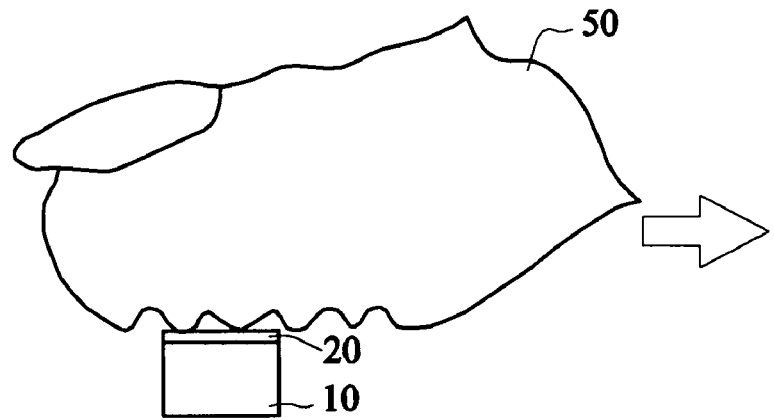
FIG. 4 shows another example of an application of the semiconductor IC chip of FIG. 1.
Figure 5:
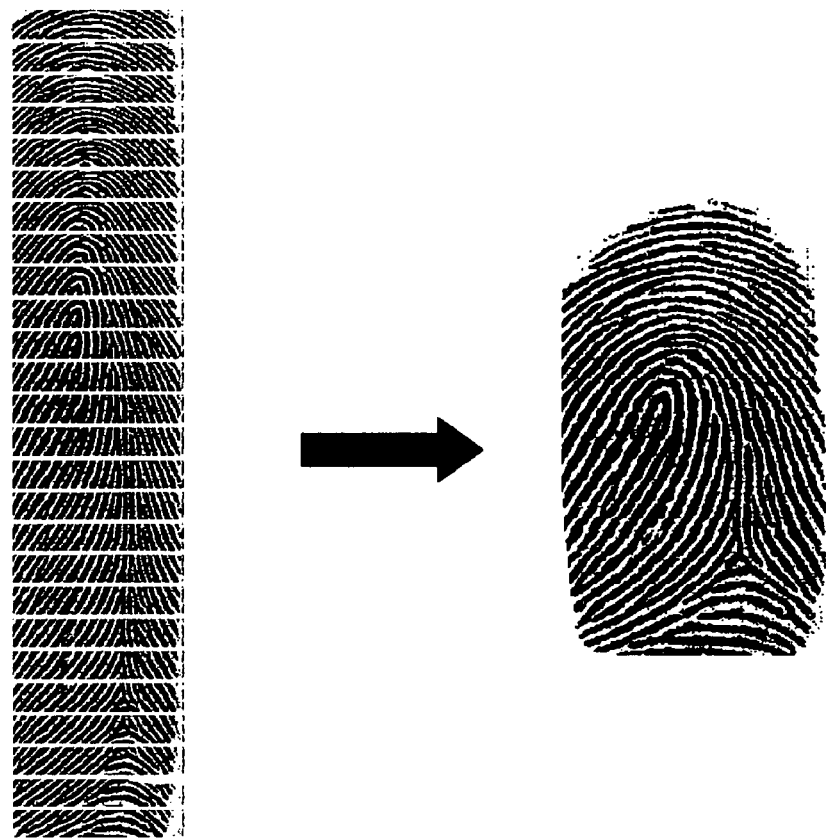
FIG. 5 is a schematic illustration showing a plurality of fragment fingerprint images, which is obtained by the semiconductor IC chip of FIG. 4 and is combined into a fingerprint image.

FIG. 4 shows another example of an application of the semiconductor IC chip of FIG. 1. As shown in FIG. 4, the IC chip body 10 may sense a plurality of fragment fingerprint images of the finger 50 when the finger 50 sweeps across the IC chip body 10 so that the fragment fingerprint images may be combined into a whole fingerprint image, as shown in FIG. 5, after the subsequent processing.

The main application of the invention is to form a nano-structure-surface passivation film on a surface of a semiconductor integrated circuit chip so that the surface of the semiconductor integrated circuit chip has the contamination-resistant, hydrophobic and oleophobic properties, and is especially suitable for the semiconductor fingerprint sensor, such as a capacitive-type sensor, an electric-field-type sensor, a thermo-type sensor or any other type of sensor like optical sensor. Thus, it is possible to prevent the contamination and the latent fingerprint of the finger of the user from being left on the chip, and the fingerprint reading and recognizing quality can be enhanced. The preferred material used in this invention is the composite resin having the nano-structure-surface. This nano-structure-surface advantageously has the lotus effect and the oleophobic, hydrophobic and contamination-resistant properties. In addition, the hardness and the wear-resistant property of the composite resin are very good, and the chip surface cannot be easily scratched. In addition, the invention also satisfies the environment protection requirement because no halogen compound is used.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A semiconductor integrated circuit chip, comprising:
   an integrated circuit (IC) chip body having at least one surface; and
   a nano-structure-surface passivation film, which has a lotus effect and is formed on the at least one surface, for protecting the IC chip body from encountering any external interference, wherein the IC chip body further has a plurality of fingerprint sensing members for sensing a whole fingerprint or a partial fingerprint.

2. The chip according to claim 1, wherein the nano-structure-surface passivation film has a thickness ranging from 0.3 to 10 microns.

3. The chip according to claim 1, wherein the IC chip body senses a plurality of fragment fingerprint images of a finger when the finger sweeps across the IC chip body.

4. The chip according to claim 1, wherein the IC chip body senses a fingerprint image of a finger when the finger is placed on the IC chip body stationarily.

5. The chip according to claim 1, wherein the at least one surface is made of silicon dioxide or silicon nitride.

6. The chip according to claim 1, wherein the nano-structure-surface passivation film contains nano-particles and a carrier resin.

7. The chip according to claim 1, wherein the nano-structure-surface passivation film is made of a dielectric material or an insulation material.

8. The chip according to claim 1, wherein the IC chip body further has an electrostatic discharge metal net structure for discharging electrostatic charges.

9. The chip according to claim 8, wherein the electrostatic discharge metal net structure is exposed from the nano-structure-surface passivation film.

* * * * *